US008161247B2

(12) United States Patent
Gray et al.

(10) Patent No.: US 8,161,247 B2
(45) Date of Patent: Apr. 17, 2012

(54) WAIT LOSS SYNCHRONIZATION

(75) Inventors: Jan Gray, Bellevue, WA (US); David Callahan, Seattle, WA (US); Burton Jordan Smith, Seattle, WA (US); Gad Sheaffer, Haifa (IL); Ali-Reza Adl-Tabatabai, San Jose, CA (US); Bratin Saha, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 12/493,163

(22) Filed: Jun. 26, 2009

(65) Prior Publication Data

US 2010/0332753 A1    Dec. 30, 2010

(51) Int. Cl.
*G06F 12/00* (2006.01)
*G06F 13/00* (2006.01)
*G06F 13/28* (2006.01)
*G06F 1/00* (2006.01)
*G06F 1/26* (2006.01)
*G06F 1/32* (2006.01)
*G06F 9/46* (2006.01)

(52) U.S. Cl. ........ 711/141; 711/154; 711/118; 711/144; 711/145; 711/146; 713/300; 713/320; 713/323; 713/324; 718/101

(58) Field of Classification Search .................. 711/141
See application file for complete search history.

(56) References Cited

U.S. PATENT DOCUMENTS

| | | |
|---|---|---|
| 5,394,555 A | 2/1995 | Hunter |
| 5,404,555 A | 4/1995 | Liu |
| 5,768,500 A | 6/1998 | Agrawal |
| 6,314,563 B1 | 11/2001 | Agesen |
| 6,665,704 B1 | 12/2003 | Singh |
| 6,751,617 B1 | 6/2004 | Anfindsen |
| 6,842,830 B2 | 1/2005 | Khare |
| 6,845,430 B2 | 1/2005 | Hopeman |
| 6,862,635 B1 | 3/2005 | Alverson |
| 6,871,264 B2 | 3/2005 | Soltis |
| 6,898,609 B2 | 5/2005 | Kerwin |
| 6,976,155 B2 | 12/2005 | Drysdale |
| 7,111,294 B2 | 9/2006 | Steensgaard |
| 7,162,512 B1 | 1/2007 | Amit |
| 7,181,578 B1 | 2/2007 | Guha |

(Continued)

OTHER PUBLICATIONS

Ananian; "Unbounded Transactional Memory"; 2009; pp. 1-12; http://supertech.csail.mit.edu/papers/xaction.ps.

(Continued)

*Primary Examiner* — Sanjiv Shah
*Assistant Examiner* — Marwan Ayash
(74) *Attorney, Agent, or Firm* — Workman Nydegger

(57) ABSTRACT

Synchronizing threads on loss of memory access monitoring. Using a processor level instruction included as part of an instruction set architecture for a processor, a read, or write monitor to detect writes, or reads or writes respectively from other agents on a first set of one or more memory locations and a read, or write monitor on a second set of one or more different memory locations are set. A processor level instruction is executed, which causes the processor to suspend executing instructions and optionally to enter a low power mode pending loss of a read or write monitor for the first or second set of one or more memory locations. A conflicting access is detected on the first or second set of one or more memory locations or a timeout is detected. As a result, the method includes resuming execution of instructions.

13 Claims, 4 Drawing Sheets

U.S. PATENT DOCUMENTS

| | | |
|---|---|---|
| 7,210,145 B2 | 4/2007 | Srinivasan |
| 7,213,106 B1 | 5/2007 | Koster |
| 7,246,123 B2 | 7/2007 | Carr |
| 7,376,800 B1 | 5/2008 | Choquette |
| 7,395,382 B1 | 7/2008 | Moir |
| 7,406,698 B2 | 7/2008 | Richardson |
| 7,467,323 B2 | 12/2008 | Fields |
| 7,478,210 B2 | 1/2009 | Saha |
| 7,502,897 B2 | 3/2009 | Hertzberg |
| 7,512,636 B2 | 3/2009 | Verma |
| 7,516,366 B2 | 4/2009 | Lev |
| 2003/0188300 A1 | 10/2003 | Patrudu |
| 2004/0243868 A1* | 12/2004 | Toll et al. ............ 713/323 |
| 2006/0085591 A1 | 4/2006 | Kumar |
| 2007/0143287 A1 | 6/2007 | Adi-tabatabai |
| 2007/0156780 A1 | 7/2007 | Saha |
| 2007/0156994 A1 | 7/2007 | Akkary |
| 2007/0198792 A1 | 8/2007 | Dice |
| 2007/0198979 A1 | 8/2007 | Dice |
| 2007/0245099 A1 | 10/2007 | Gray |
| 2007/0260608 A1 | 11/2007 | Hertzberg |
| 2007/0260942 A1 | 11/2007 | Rajwar |
| 2008/0021934 A1 | 1/2008 | Hudson |
| 2008/0040551 A1 | 2/2008 | Gray |
| 2008/0162886 A1 | 7/2008 | Saha |
| 2008/0270745 A1 | 10/2008 | Saha |
| 2009/0006467 A1 | 1/2009 | Visscher |
| 2009/0006751 A1 | 1/2009 | Taillefer |
| 2009/0006767 A1 | 1/2009 | Saha |
| 2009/0007119 A1 | 1/2009 | Blumrich |
| 2009/0063780 A1 | 3/2009 | Terechko |
| 2009/0089520 A1 | 4/2009 | Saha |
| 2009/0113443 A1 | 4/2009 | Heller |

OTHER PUBLICATIONS

Shriraman; "Hardware Acceleration of Software Transactional Memory"; Dec. 2005; pp. 1-22; https://urresearch.rochester.edu/retrieve/5518/05.tr887.Hardware_acceleration_of_software_transactional_memory.pdf.

Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.

Yen; "LogTM-Se: Decoupling Hardware Transactional Memory from Caches"; Feb. 10-14, 2007; pp. 1-12; http://www.cs.wisc.edu/multifacet/papers/hpca07_logtmse.pdf.

Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.

U.S. Appl. No. 12/495,582, filed Jun. 30, 2009, Gray.

Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.

Moravan; "Supporting Nested Transactional Memory in LogTM"; Oct. 21-25, 2006; pp. 1-12; http://www.cs.wisc.edu/multifacet/papers/asplos06_nested_logtm.pdf.

Author Unknown; "Extending Hardware Transactional Memory to Support Non-Busy Waiting and Non-Transactional Actions"; 2006; pp. 1-19; http://209.85.229.132/search?q=cache:-9KSLEk_CcIJ:www.cs.purdue.edu/homes/jv/events/TRANSACT/slides/zilles.pdf+non-transactional+instructions+and+abort&cd=3&hl=en&ct=clnk&gl=in.

Carlstrom; "The ATOMOΣ Transactional Programming Language"; Jun. 11-16, 2006; pp. 1-13; http://tcc.stanford.edu/publications/tcc_pldi2006.pdf.

Moss; "Open Nested Transactions"; Semantics and Support ; 2006; pp. 1-8 ; http://www.cs.utah.edu/wmpi/2006/final-version/wmpi-posters-1-Moss.pdf.

Minh; "An Effective Hybrid Transactional Memory System with Strong Isolation Guarantees"; Jun. 9-13, 2007; pp. 1-12; http://tcc.stanford.edu/publications/tcc_isca2007.pdf.

Bracy; "Disintermediated Active Communication"—Nov. 9, 2006—pp. 1-4—http://ieeexplore.ieee.org/stamp/stamp.jsp?arnumber=04069172.

Shriraman; "Hardware Acceleration of Software Transactional Memory"—Dec. 2005—pp. 1-22—https://urresearch.rochester.edu/retrieve/5518/05.tr887.Hardware_acceleration_of_software_transactional_memory.pdf.

Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.

Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.

Lilja; "Cache Coherence in Large-Scale Shared Memory Multiprocessors:Issues and Comparisons"—Sep. 1993 —pp. 1-43— http://www.arctic.umn.edu/papers/coherence-survey.pdf.

Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.

Papamarcos; "A Low-Overhead Coherence Solution for Multiprocessors with Private Cache Memories"—1984—pp. 348-354— http://www.csl.cornell.edu/courses/ece572/papamarcos.isca84.pdf.

Chuang; "Unbounded Page-Based Transactional Memory"—Oct. 21-25, 2006—pp. 1-12—http://www.cse.ucsd.edu/~wchuang/ASPLOS-06-PTM.pdf.

Swift; "OS Support for Virtualizing Hardware Transactional Memory"—2008—pp. 1-10—http://www.cs.wisc.edu/multifacet/papers/transact08_tvm.pdf.

Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.

Andrew; "A Dictionary of HTML META Tags"—Feb. 11, 2007—pp. 1-11—http://vancouver-webpages.com/META/metatags.detail.html.

Spear; "Implementing and Exploiting Inevitability in Software Transactional Memory"—2008—pp. 59-66—http://ieeexplore.ieee.org/stamp/stamp.jsp?arnumber=04625833.

Author Unknown; Wikipedia; "Software Transactional Memory"— May 7, 2009—pp. 1-7—http://en.wikipedia.org/wiki/Software_transactional_memory.

Chong; "Scalable HMM based Inference Engine in LVCSR"; Mar. 31, 2009; 1 page; http://www.icsi.berkeley.edu/cgi-bin/events/event.pl?ID=000531.

Zeichick; "Massive Multi-Core Processors: The Gamer's Edge"; Oct. 4, 2007; pp. 1-2; http://developer.amd.com/documentation/articles/Pages/1042007177.aspx.

Vasantharam; "CSMP"; 2009; pp. 1-3; http://sourceforge.net/projects/mupisoft/.

* cited by examiner

WAIT LOSS SYNCHRONIZATION

CROSS-REFERENCE TO RELATED APPLICATIONS

This application is related to U.S. patent application Ser. No. 12/493,167 filed Jun. 26, 2009, and entitled "PERFORMING ESCAPE ACTIONS IN TRANSACTIONS", as well as U.S. application Ser. No. 12/493,168, filed Jun. 26, 2009, and entitled "MINIMIZING CODE DUPLICATION IN AN UNBOUNDED TRANSACTIONAL MEMORY SYSTEM", as well as U.S. application Ser. No. 12/493,162, filed Jun. 26, 2009, and entitled "FLEXIBLE READ-AND WRITE-MONITORED AND BUFFERED MEMORY BLOCKS", as well as U.S. application Ser. No. 12/493,164, filed Jun. 26, 2009, and entitled "PRIVATE MEMORY REGIONS AND COHERENCE OPTIMIZATIONS", as well as U.S. application Ser. No. 12/493,161, filed Jun. 26, 2009, and entitled "OPERATING SYSTEM VIRTUAL MEMORY MANAGEMENT FOR HARDWARE TRANSACTIONAL MEMORY", as well as U.S. application Ser. No. 12/493,165, filed Jun. 26, 2009, and entitled "METAPHYSICALLY ADDRESSED CACHE METADATA". All of the foregoing applications are being filed concurrently herewith and are incorporated herein by reference.

BACKGROUND

Background and Relevant Art

Computers and computing systems have affected nearly every aspect of modern living. Computers are generally involved in work, recreation, healthcare, transportation, entertainment, household management, etc.

Computing systems have decision making abilities. For example, a segment of code may be executed and based on the value of data, various branches in the code may be taken. Additionally, segments of code may be executed on the happening of some event. In some embodiments, it may be desirable to execute a segment of code when data changes. Monitoring for data changes can be performed in one example by using spin polling. Spin polling involves repeatedly performing load operations by a processor to poll various data sources or data stores for data or changes in data. However, spin polling results in heavy processor usage and hence heavy power usage. Advances in modern computing are often directed at reducing the amount of power used by a processor. Thus, spin polling is a practice contrary to goals to reduce power consumption.

One way that systems can reduce power consumption is by placing a monitor on certain data and then putting the processor to sleep. Less power hungry circuits are used to monitor the data and can wake the processor on changes in the data. However, these systems do not expose software accessible instructions or are typically only configured to monitor a single data location or a single range of data addresses.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method practiced in a computing environment. The method includes acts for detecting memory accesses. The method includes using a processor level instruction included as part of an instruction set architecture for a processor, setting a read, or write monitor to detect writes, or reads or writes by other agents respectively on a first set of one or more memory locations. The method further includes using a processor level instruction included as part of an instruction set architecture for a processor, setting a read, or write monitor to detect writes, or reads or writes respectively by other agents on a second set of one or more different memory locations. The method further includes executing a processor level instruction included as part of an instruction set architecture for a processor which causes a thread to suspend execution of instructions pending loss of a read or write monitor for the first or second set of one or more memory locations. A conflicting access from another agent is detected on the first or second set of one or more memory locations or a timeout is detected. As a result of detecting a conflicting access or detecting the timeout, the method includes the thread resuming execution of instructions.

Another embodiment includes a method practiced in a computing environment. The method includes acts for detecting memory accesses. The method includes using a processor level instruction included as part of an instruction set architecture for a processor, setting a read, or write monitor to detect writes, or reads or writes by other agents respectively on a first set of one or more memory locations. The method further includes using a processor level instruction included as part of an instruction set architecture for a processor, setting a read, or write monitor to detect writes, or reads or writes respectively by other agents on a second set of one or more different memory locations. The method further includes executing a processor level instruction included as part of an instruction set architecture for a processor which causes a thread to suspend execution of instructions and a processor for the thread enters a low power mode pending loss of a read or write monitor for the first or second set of one or more memory locations. A conflicting access from another agent is detected on the first or second set of one or more memory locations or a timeout is detected. As a result of detecting a conflicting access or detecting the timeout, the method includes the thread resuming execution of instructions.

Another embodiment includes a method practiced in a computing environment. The method includes acts for detecting memory accesses. The method includes using a processor level instruction included as part of an instruction set architecture for a processor, setting a write monitor to detects reads or writes by another agent on a set of one or more memory locations. A processor level instruction included as part of an instruction set architecture for a processor is executed which causes a thread to suspend execution of instructions pending loss of write monitor for the set of one or more memory locations. A conflicting access by another agent is detected on the set of one or more memory locations or a timeout is detected. As a result of detecting a conflicting access or detecting the timeout, the method includes the thread resuming execution of instructions.

Another embodiment is directed to a method practiced in a computing environment. The method includes acts for detecting memory accesses. The method includes using a processor level instruction included as part of an instruction set architecture for a processor, setting a read monitor to detect writes by another agent on a first set of one or more memory locations. The method further includes using a processor level instruction included as part of an instruction set architecture for a processor, setting a read monitor to detect writes by another agent on a second set of one or more different memory locations. A processor level instruction included as part of an instruction set architecture for a processor is executed which causes the thread to suspend execution of instructions pending loss of a read monitor for the first or second set of one or more memory locations. A conflicting access from another agent on the first or second set of one or more memory locations is detected, or a timeout is detected. As a result of detecting a conflicting access or detecting the timeout, the method includes the thread resuming execution of instructions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein implement a processor with an instruction set architecture which supports read and write monitoring (RM/WM). In particular, processor level instructions may be executed by a processor which set read and or write monitoring on data in a shared memory, such as in a level 1 data cache (L1D$). Read and write monitor states may be used to detect conflicting accesses by other agents that access the monitored locations in shared memory. An agent is a component of a computer system that interacts with shared memory. For example it may be a CPU core or processor, another thread in a multi-threaded CPU core, a DMA engine, a memory mapped peripheral, etc. By definition, a read monitor on a shared memory location detects writes to that address by other agents, and a write monitor on a shared memory location detects reads or writes to that location by other agents. Read or write monitors on shared memory locations may be explicitly set for example by software by executing certain instructions, or may implicitly set for example by hardware when executing in certain modes. When another agent performs a conflicting access to a monitored location, the read or write monitor on that location is 'lost' (deasserted). This may be manifest in a loss of read or loss of write monitoring event. Additionally, read or write monitors may be spontaneously lost even in the absence of a conflicting access from another agent. Loss of monitoring events may be accumulated for example, into a special register in the processor. For example, event generation may occur into a transaction status register (TSR). An ejection (jump to a software event handler) on some set of loss events may occur. In some embodiments a processor level instruction may be executed by a processor to reset all read and write monitors for a thread.

The sets of locations to be monitored may be represented and implemented, for example in a modified data cache. For example, read monitor and write monitor indicators may be added to the state of each cache line. Memory accesses by other agents to monitored cache lines may be observed using the shared memory cache coherence protocol and cache snooping logic.

Additionally, a wait loss instruction may be implemented in an instruction set architecture for a processor in some embodiments. The wait loss instruction provides a processor level mechanism to suspend thread execution pending a monitor loss event on a monitored memory location. It may also provide a mechanism to put a processor core to sleep, without putting the cache snooping logic to sleep pending a monitor loss event on any monitored cache lines. Further, in some embodiments, a separate monitoring engine may be used such that the wait loss instruction can be used to put the entire processor and its cache to sleep.

Figure 1A:
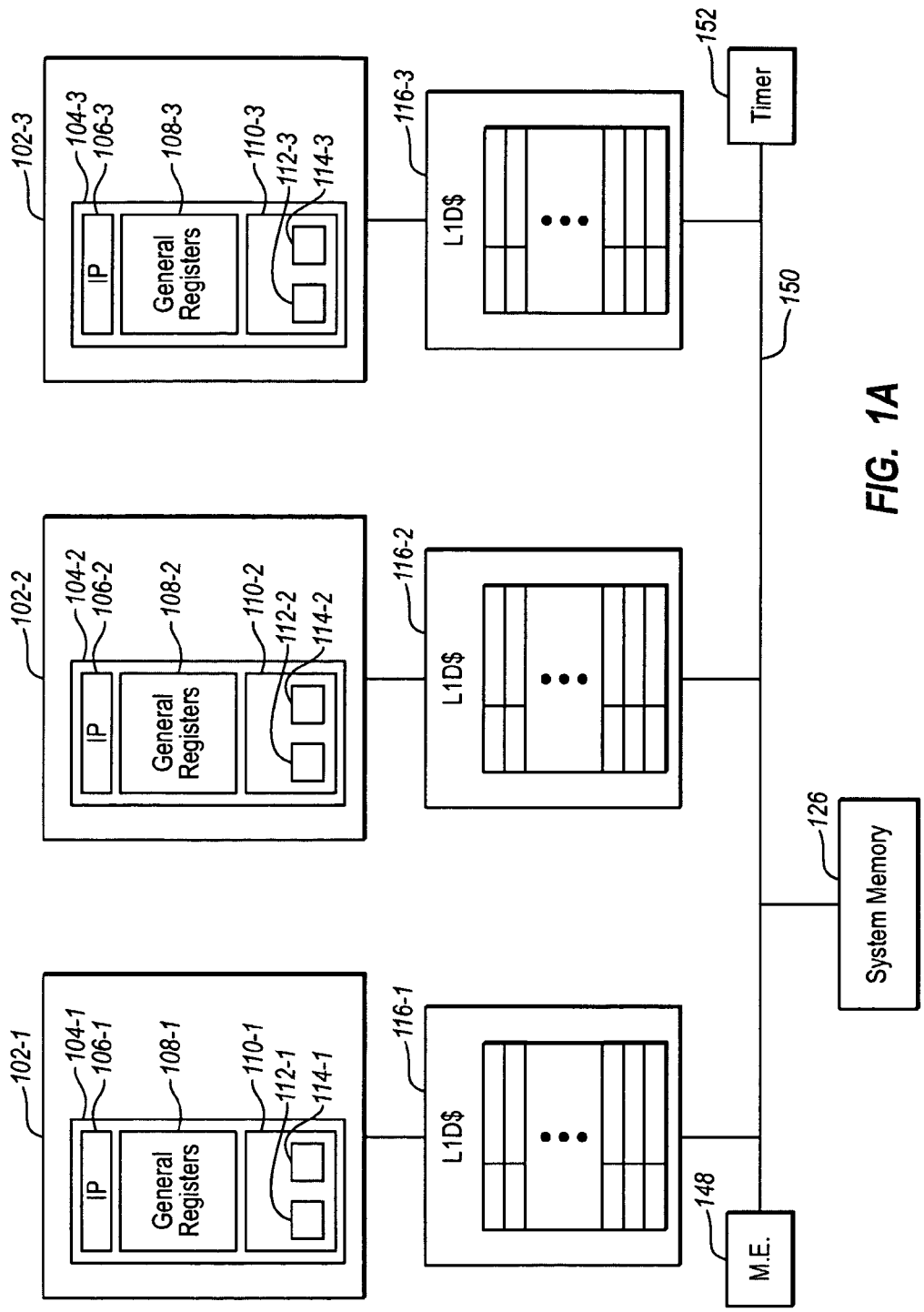
FIG. 1A illustrates a memory hierarchy.

Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-1-102-3 supports a single thread 104-1-104-3 respectively. Each of the threads 104-1-104-3 includes an instruction pointer 106-1-106-3, general registers 108-1-108-3, and special registers 110-1-110-3. Each of the special registers 110-1-110-3 includes a transaction control register (TCR) 112-1-112-3 and a transaction status register (TSR) 114-1-114-3. The functionality of these registers will be explained in more detail below in conjunction with the description of FIG. 1B.

Figure 1B:
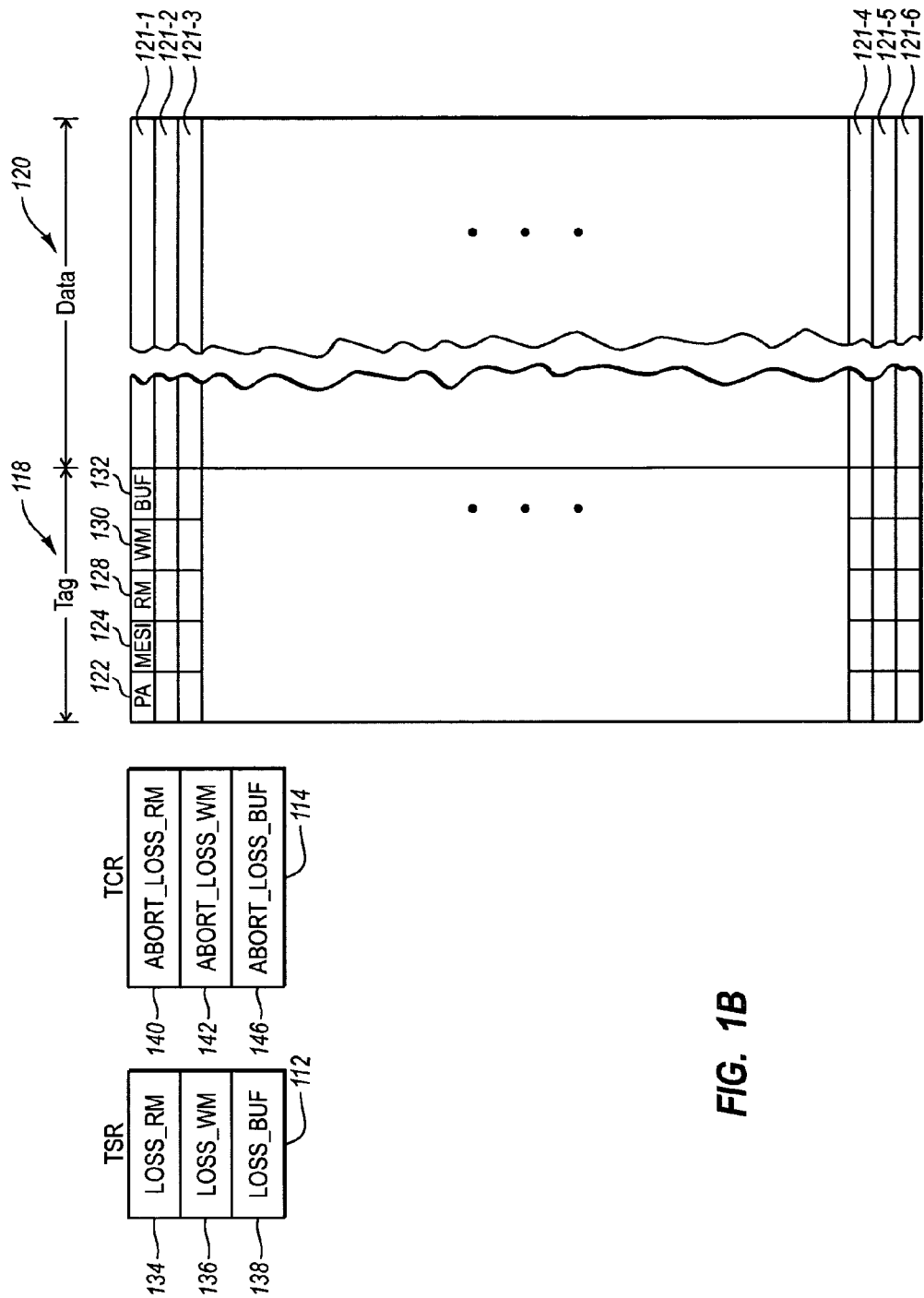
FIG. 1B illustrates data cache details.

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120 for each cache line 121. The tag column 118 typically includes an address column 122 and a MESI column 124. The address column 122 includes a physical address or subset of physical address bits for data stored in the data column 120. In particular, as illustrated in FIG. 1A, a computing system generally includes a shared system memory 126. The system memory may be, for example semiconductor based memory, one or more hard-drives and/or flash drives. The system memory 126 has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line 121 basis for a particular thread, and indicates whether or not a block of data in the data column 120 is monitored to determine if the data in the data column 120 is written to by another thread. A WM entry in the WM column 120 is set on a cache line 121 basis for a particular thread, and indicates whether or not the block of data in the data column 120 is monitored to determine if the data in the data column is read by or written to by another thread. A BUF entry in the BUF column is set on a cache line 121 basis for a particular thread 132, and indicates whether or not data in an entry of the data column 120 is buffered data or if the data is cached data. In particular, the BUF entry can indicate whether a block of data is participating in shared memory cache coherence or not (from the perspective of a thread).

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture as will be demonstrated in further detail below. In particular, using processor level instructions included as part of the instruction set architecture of the processor, a programmer can set and test values for the RM column 128, the WM column 130, and BUF column 132.

FIG. 1B further illustrates details of the transaction status register 112 included in the hardware threads 104. The transaction status register 112 accumulates events related to the read monitor indicator, the write-monitor indicator, and the buffer indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor to be set on a location. In particular the read monitor indicator 128 is set for the cache line 121-1 that caches the location's memory block. If another thread or agent subsequently writes to a location in the memory block, a cache coherence operation will occur that can be observed at L1D$ 116-1. For example, in a bus-based snooping cache implementation, the other agent's access will be broadcast over the shared memory bus 150, and observed at L1D$ 116-1, and may cause a change in the location's cache line's cache coherence MESI state 124 which in turn may cause the read monitor indicator 128 to be cleared. This event may be captured in the loss of read monitor entry 134. Other actions may also cause read or write monitors to be lost. For example, in a cache based implementation, if a cache line is evicted, written back, or repurposed to make room for other cache data, or if the cache line is invalidated following a memory access by another agent, the read monitor, write monitor, or buffer state may lost, and these events may also be captured in entries 134, 136, or 138 respectively.

FIG. 1B illustrates further details of the transaction control register 114. The transaction control register 114 includes entries defining actions that should occur on the loss of read monitor, write-monitor, and/or buffer. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the laws of the buffer.

For example, and continuing with the example above where a software designer has coded instructions that when executed by the thread 104-1 cause a read monitor indicator to be set for a memory block, if another thread writes to the memory block, in addition to noting such access in the read monitor entry 134, the read monitor indicator in the read monitor column 128 may be reset.

As noted previously, a wait loss instruction may be implemented in an instruction set architecture for the processors 102. The wait loss instruction provides a mechanism to put a processor core 102 to suspend instruction issue in a thread. It may also provide a mechanism to put a processor core 102 into a low power sleep state, without putting the L1D$ tag snooping to sleep pending a monitor loss event on any monitored cache lines 121 in the L1D$ 116. In this way, the L1D$ tag snooping can be used to monitor for a loss of read or write monitor (i.e. a conflicting memory access) rather than having a processor spin poll. Notably, embodiments allow for setting read and write monitoring on a plurality of non continuous locations. For example, as illustrated in FIG. 1B, different cache lines (e.g. cache line 121-1 and 121-6) that cache or store non-continuously addressed data may both have read or write monitoring placed on them. A memory access in conflict with the read or write monitor (i.e. a write; or a read or write respectively once a read or write monitor has been set) on any of the plurality of locations may be observed or summarized as a loss of monitoring event, when such conflict is accumulated in the transaction status register 112. This differs significantly from previous solutions that only allowed for monitoring of a single location or single address range, or did not provide software with a means to flexibly and step by step set, clear, and interrogate such monitoring state.

Some embodiments may include support for explicit software memory monitoring when applied to general problems of inter thread synchronization. In some embodiments, given a set of threads in a multiprocessor, flexible scalable multi-event synchronization amongst the threads can be performed. For example, consider a scenario where M threads are producing values into their own message queues/channel data structures, and N other threads are each cooperatively consuming some subsets of the messages of these M queues. Rather than spin-polling, it may be preferable for each of the N consumer threads to efficiently sleep awaiting new messages on their respective subsets of the M channels. However, it may also be desirable for the M producers to efficiently produce to their private queues without contending with each other to update some shared status or publish-subscribe summary data structures.

Each consumer thread, in one embodiment, needs only to set an RM on each of its subset of the M channels' data structures, then wait for an indication in the transaction status register that the read monitor has been lost. E.g., in one example as illustrated in FIG. 1, at 134 a register TSR. LOSS_RM=1. A wait loss ("wait for loss of monitoring") instruction can provide a mechanism to suspend the thread pending a monitor loss event on any of its monitored lines. It may also put the processor core (but not the cache snooping based monitoring circuitry) into a low power sleep state while suspended. A wait loss instruction may be a privileged instruction that traps when executed in user mode, it may also be available in user mode, etc. For example, the following is an example code sequence illustrating the use of example new instructions RESET_ALL_MONITORS, MOVCR TSR, SET_RM, and WAIT_LOSS, used by one thread to efficiently await updates to a set of message queues that may be written by other threads. After resetting all monitors and resetting TSR.LOSS_RM, the code sequence establishes read monitoring on the three queue headers and executes a user mode WAIT_LOSS instruction to efficiently await update to these data structures by any thread.

|  |  |  |
|---|---|---|
|  | RESET_ALL_MONITORS | ; clear all RM and WM monitors |
|  | MOVCR TSR,#0 | ; reset TSR.LOSS_RM etc. |
|  | SET_RM queue1.header | ; monitor any writes to queue1 |
|  | SET_RM queue2.header | ; monitor any writes to queue2 |
|  | SET_RM queue5.header | ; monitor any writes to queue5 |
|  | WAIT_LOSS #timeout|LOSS_RM | ; await writes or timeout |
|  | JNC Ready | ; jump to Ready if TSR.LOSS_RM |
| TimeOut: | ... | ; handle timeout case |
| Ready: | ... | ; handle data ready case |

Further, in some embodiments, a separate monitoring engine 148 as illustrated in FIG. 1A on the system cache coherence interconnect fabric could be used to monitor for the loss of the read monitor. For example, the monitoring engine 148 can monitor traffic on the cache bus 150. This monitoring engine enables powering down the whole processor and its cache. The monitoring engine 148 may be another core within the system. However, the monitoring engine 148 may be a lower power processor or special-purpose logic with limited functionality so as to conserve die area or power. For example, it may resemble a cache but lack cache data arrays. For example, it may represent monitored sets of locations with space efficient alternative data structures such as bit maps, lists of address intervals, or may approximate the sets of locations and their intersections, using Bloom filters. Further, as illustrated in the example, the monitoring engine 148 may monitor a number of different processors and their caches such that monitoring tasks can be consolidated to a single agent. Notably, some embodiments may include a monitoring engine 148 included in a processor die or chip package. Embodiments may also incorporate timeout logic or otherwise interact with runtime software.

A related issue involves efficiently synchronizing to some number of hardware events or software events. One embodiment can integrate various hardware event signals into the same conflicting access monitoring mechanism. If periodic timers, countdown interval timers, hardware control register events (transmitter buffer empty), etc. provide cache coherent memory mapped event control registers, then software can apply monitoring to simultaneously and efficiently wait for changes in a number of memory mapped hardware events (such as by setting a read or write monitor on memory mapped I/O) as well as a number of software data structure events (such as the M producers described above), or any combination of both.

In one embodiment, a central, memory mapped system timer 152 could provide a variety of timer count resolutions, for example, 1 s, 100 µs, 10 µs, . . . , 100 ns, 10 ns, 1 ns counters that each update (periodically spontaneously invalidate) a separate cache line address in shared memory. Any number of threads could place a read monitor on some of these addresses as appropriate and execute wait loss instructions such that these threads could synchronize to the same time pulse, sleep on it, and awaken nearly simultaneously. This could be used when there is benefit in their near simultaneous execution, such as efficient sharing of temporally coherent data in the computation that follows.

Notably, while timers have been illustrated herein, it should be appreciated that any of a number of different memory mapped I/O embodiments may be implemented. For example, embodiments may monitor various peripheral hardware alerts, alarm system reporting, or other events.

Another embodiment finds particular utility in the implementation of unbounded transactional memory. Often computing systems implement transactional operations where for a given set of operations, either all of the operations are performed or none of the operations are performed. For example, a banking system may have operations for crediting and debiting accounts. When operations are performed to exchange money from one account to another, serious problems can occur if the system is allowed to credit one account without debiting another account. However, transactional computing maintains data versioning information such that transaction can be aborted and operations can be rolled back if all operations in an atomic set of operations cannot be performed. For example, the set of data written within one transaction may intersect with the set of data read or written by another concurrent transaction, in which case, the transaction system rolls back the transaction (aborts it) and later retries it. Or for example, software may discover a transitory condition such as 'input queue empty' that means the current transaction should not continue, so software performs a transaction Retry statement, which aborts the transaction, to retry it again later, presumably when conditions have changed (e.g. when some data in the read set of the transaction has changed). Often, when a transaction is aborted, a retry of the transaction will be attempted.

If a retry is attempted immediately after a transaction aborts, it is likely that the transaction will abort again for the same reason as the first abort. Thus, when software executes to a Retry statement, it may be beneficial to rollback, release any locks, go to sleep until a memory location in its read set is updated, then restart. However, it requires considerable expensive data structure bookkeeping to track the read sets of every memory transaction and to intersect them with the write sets of other committing transactions, to discover which transactions to schedule for automatic reexecution. In the previous examples, software has been used to explicitly set read and write monitoring on specific locations. However, embodiments may also be implemented that provide configurable hardware execution modes that automatically and implicitly establish read monitoring on any memory location that is read and write monitoring on any memory location that is written. This capability can form the basis of a simple cache resident transactional memory. Embodiments may be beneficially implemented by allowing read monitoring to be set on every location read in the transaction, thus representing the read set in the set of hardware read monitored memory locations, and to use a wait loss instruction on the read monitors, along with a timeout to implement an energy efficient wait for an update to data in the transaction's read set. In particular, embodiments may be implemented by setting read monitoring on a cache line when a transaction has failed or aborted.

Additional embodiments may be implemented to facilitate efficient flexible data watch breakpoints. When debugging computer programs, it may be helpful to detect when arbitrary sets of memory locations or data structures are written or read by any thread or agent in the process. Embodiments may be implemented where read or write monitoring respectively can be placed on cache lines 121 to determine when such an access occurs. The debugger establishes a helper thread in the subject debugee process to monitor accesses. This thread issues a sequence of instructions to set read and/or write monitors as desired, then issues a wait loss instruction to sleep pending access by other debugee threads. When any thread writes a read monitored line or reads a write monitored cache line including any of the monitored set of locations, loss of monitoring occurs and the helper thread wakes up and may notify the debugger or suspend the execution of the other threads in the debugee process. This allows for implementing a multitude of data watch breakpoints for the cost of one agent, such as a thread or processor, in a computing system.

Embodiments may also be implemented to detect intrusion or unauthorized access of various data structures. In particular, read monitors may be placed on data which should not be written by other threads, and/or one or more write monitors may be placed data which should not be read or written by other threads. Any conflicting access event, either read or write, will be accumulated in the loss of read monitor entry 134 or loss of write monitor entry 136 of the transaction status register. Setting abort on loss of read monitor ABORT_LOSS_RM 140 or abort on loss of write monitor ABORT_LOSS_WM 142 entries in the transaction control register TCR 114 enables a jump to an arbitrary software intrusion event handler when the corresponding monitor loss event occurs.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 2:
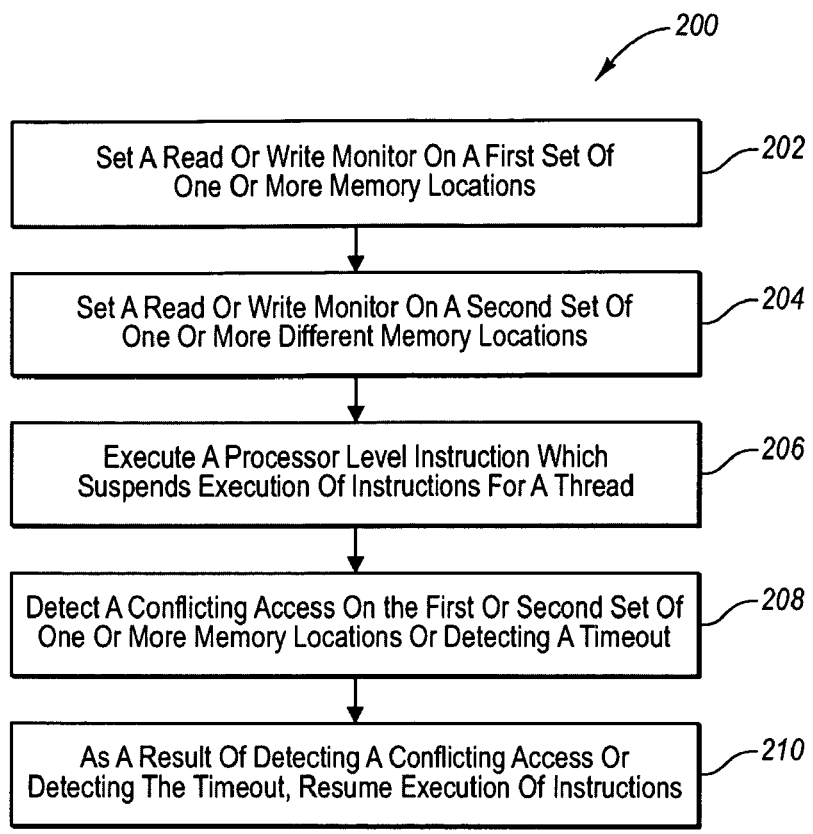
FIG. 2 illustrates a method of detecting conflicting memory accesses.

Referring now to FIG. 2, a method 200 is illustrated. The method 200 may be practiced in a computing environment and includes acts for detecting memory accesses. The method includes using a processor level instruction included as part of an instruction set architecture for a processor, setting a read, or write monitor to detect writes, or reads or writes respectively by other agents on a first set of one or more memory locations (act 202). For example, FIG. 1A illustrates a number of processors 102 that may be designed with an instruction set architecture that allows for setting of read and write monitors on sets of memory locations (as illustrated in FIG. 1B and as described above).

The method 200 further includes using a processor level instruction included as part of an instruction set architecture for a processor, setting a read, or write monitor to detect writes, or reads or writes respectively by other agents on a second set of one or more different memory locations (act 204). Illustrating now an example of the acts 202 and 204, a read or write monitor may be placed data cached in cache line 121-1 and a second read or write monitor may be placed on data cached in cache line 121-6. These cache lines may store data that is addressed in a disjoint fashion. In particular, the address of data at the cache line 121-1 may be different and not adjacent to the address of the data at the cache line 121-6.

The method 200 further includes executing a processor level instruction included as part of an instruction set architecture for a processor which causes a thread to suspend execution of instructions and optionally causes the processor to sleep by entering a low power mode pending loss of a read or write monitor for the first or second set of one or more memory locations (act 206). For example, a processor level instruction may cause a thread in one of the processors 102-1 to suspend execution and optionally causes the processor to sleep pending a loss of a read or write monitor on a data line of the cache 116-1, as accrued in the transaction status register (e.g. 112 in FIG. 1B).

The method 200 further includes detecting a conflicting access on the first or second set of one or more memory locations or detecting a timeout (act 208). For example, if a read monitor is set on data cached in some cache line, and the data is written by another agent, or a write monitor is placed on data cached in some cache line and the data is read or written by another agent, this will be detected, such as by cache snooping or by a monitoring engine 118, and the line's read or write monitor will be lost, and the monitor loss event will be accrued in the transaction status register 112.

The method 200 further includes as a result of detecting a conflicting access or detecting the timeout, optionally waking the processor, and resuming execution of the thread (act 210). For example, if a conflicting shared memory access by another agent (i.e. in conflict with the data's read or write monitor established by this processor) is detected on a cache line of the cache 116-1, the corresponding agent, in this example, the processor 102-1 will be woken up and the thread's execution of instructions resumes.

The method 200 may be practiced where the first or second set of one or more memory locations are implemented in cache local to a processor and where causing a thread to suspend execution of instructions and causing a processor to sleep by entering a low power mode includes causing the processor to enter a low power mode without causing the cache control hardware to enter a low power mode. In this embodiment, detecting a conflicting access may be performed as a result of snooping by the cache. For example, if the processor 102-1 sleeps, the cache 116-1 may snoop the cache bus 150 to determine if other agents (e.g. processors 102-2 and 102-3) are attempting to access data structures in system memory 126 for which read or write monitors have been placed on corresponding copies in the cache 116-1.

In an alternative embodiment, the method 200 may be practiced where the first or second set of one or more memory locations are implemented in cache local to a processor and wherein causing a thread to suspend execution and a optionally causing a processor to sleep by entering a low power mode includes the processor and the cache entering a low power mode, and where detecting a conflicting access is performed by a separate monitoring engine. For example, FIG. 1A illustrates that when the processor 102-1 and cache 116-1 are put to sleep with cache lines 121 of the cache 116-1 being monitored, a monitoring engine 148 may monitor the cache bus 150 to determine if attempted accesses by other agents (e.g. processors 102-2 and 102-3) are in conflict with read or write monitors placed on the data.

The method 200 may be practiced where at least one of setting a read or write monitor on a first set of one or more memory locations or setting a read or write monitor on a second set of one or more memory locations includes setting a read or write monitor on a memory mapped I/O location. Examples of memory mapped I/O access monitoring are illustrated above. For example in one embodiment, the memory mapped I/O locations correspond to locations of peripheral control and status registers of counters, timers, etc.

The method 200 may be practiced where at least one of setting a read or write monitor on a first set of one or more memory locations or setting a read or write monitor on a second set of one or more memory locations includes setting a read or write monitor for intrusion detection. For example, one or more monitors can be placed on data within a protected address space. Attempted access of the protected address space will cause a loss of monitor event, which can be used to detect an intrusion into the protected address space.

The method 200 may be practiced where at least one of setting a read or write monitor on a first set of one or more memory locations or setting a read or write monitor on a second set of one or more memory locations includes setting one or more read monitors on a data structure used in a transaction after the transaction has aborted or been retried, so as to cause a retry of the transaction after data in the data structure changes so as to minimize the likelihood of subsequent transaction abortions. For example, if a transaction is attempted, but the transaction fails, it often makes little sense to retry the transaction until something has changed. Read monitors can be placed on data structures used in the transaction, such that when those data structures are written by other agents, such change can be detected as a loss of read monitor event and the transaction can be retried.

The method 200 may be practiced where at least one of setting a read or write monitor on a first set of one or more memory locations or setting a read or write monitor on a second set of one or more memory locations includes setting a read or write monitor for monitoring a plurality of queues. For example, agents can produce data to which other agents subscribe. Rather than spin polling queues, read monitors can be placed on these data structures, and a wait loss instruction can be executed, so the thread suspends execution of instructions until the data structure is changed by another agent.

The method 200 may further include as a result of detecting a conflicting access, ejecting (jumping directly) to a loss of monitoring handler. The handler can perform any actions appropriate for a given situation. For example, when used for intrusion detection, the handler can trigger appropriate alarms and perform actions to protect computing resources.

Figure 3:
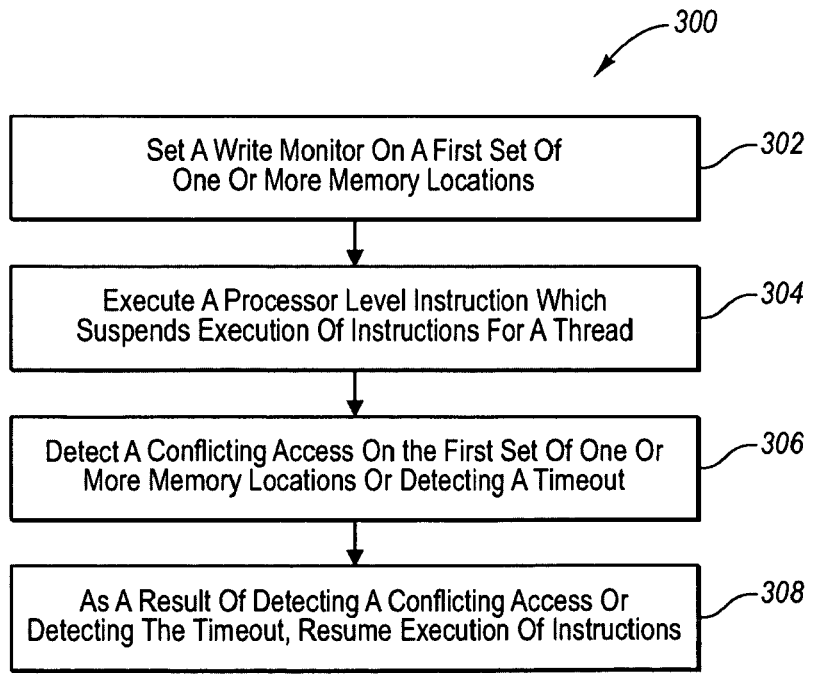
FIG. 3 illustrates an alternate method of detecting conflicting memory accesses.

Referring now to FIG. 3, a similar method 300 is illustrated. The method may be practiced in a computing environment and includes acts for detecting conflicting memory accesses by other agents. The method includes using a processor level instruction included as part of an instruction set architecture for a processor, setting a write monitor on a first set of one or more memory locations (act 302). The write monitor is configured to cause detection of both reads or writes. Examples are illustrated above.

The method 300 further includes executing a processor level instruction included as part of an instruction set architecture for a processor which causes a thread to suspend execution of instructions and optionally causes a processor to sleep by entering a low power mode pending loss of write monitor for the first set of one or more memory locations (act 304). The method 300 further includes detecting a conflicting access on the first set of one or more memory locations or detecting a timeout (act 306). The method 300 further includes as a result of detecting a conflicting access or detecting the timeout, optionally waking the processor and resuming the thread's execution of instructions (act 308).

Figure 4:
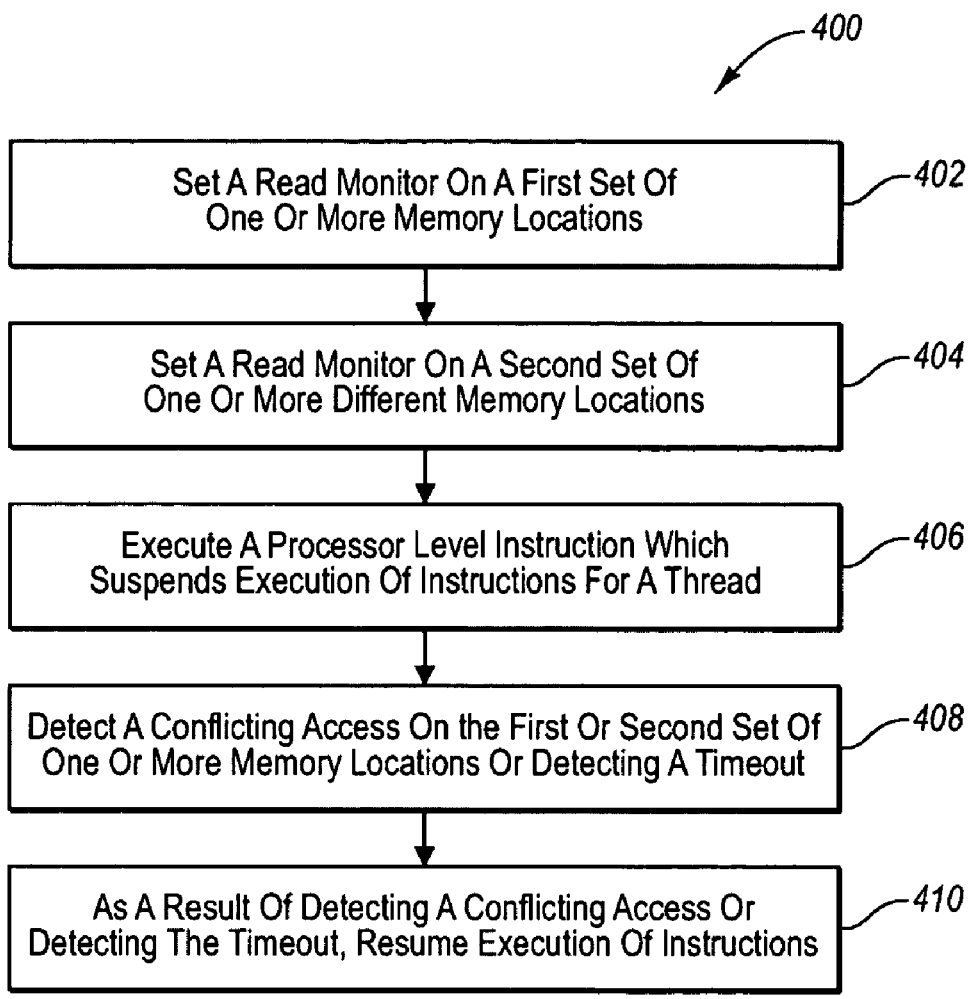
FIG. 4 illustrates an alternate method of detecting conflicting memory accesses.

Referring now to FIG. 4, a method 400 is illustrated. The method 400 is practiced in a computing environment and includes acts for detecting memory accesses. The method 400 includes using a processor level instruction included as part of an instruction set architecture for a processor, setting a read monitor to detect writes on a first set of one or more memory locations (402). The method 400 further includes using a processor level instruction included as part of an instruction set architecture for a processor, setting a read monitor to detect writes on a second set of one or more different memory locations (404). The method 400 further includes executing a processor level instruction included as part of an instruction set architecture for a processor which causes an processor to sleep by entering a low power mode pending loss of a read monitor for the first or second set of one or more memory locations (406). The method 400 further includes detecting a conflicting access on the first or second set of one or more memory locations or detecting a timeout (408). The method 400 further includes as a result of detecting a conflicting access or detecting the timeout, waking the processor (410).

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of detecting memory accesses by other agents, the method comprising:
   a thread executing a processor level instruction included as part of an instruction set architecture for a processor, setting a read, or write monitor to detect writes, or reads or writes respectively by other agents on a first set of one or more memory locations in a cache local to a processor for the thread;
   the thread executing a processor level instruction included as part of an instruction set architecture for a processor, setting a read, or write monitor to detect writes, or reads or writes respectively on a second set of one or more different memory locations in a cache local to a processor for the thread;
   adding read and write monitoring indicator states to a cache state for each cache line in the cache;
   the thread executing a processor level instruction included as part of an instruction set architecture for a processor which causes the thread to suspend execution of instructions pending loss of a read or write monitor for the first or second set of one or more memory locations;
   the thread suspending execution of instructions whereby a processor for the thread enters a low power mode pending loss of a read or write monitor for the first or second set of one or more memory locations, including causing the processor to enter a low power mode without causing the cache control hardware to enter a low power mode;
   detecting a conflicting access on the first or second set of one or more memory locations using a cache coherence system for the cache or detecting a timeout; and
   as a result of detecting a conflicting access or detecting the timeout, the thread resuming execution of instructions.

2. The method of claim 1:
   wherein detecting a conflicting access to a monitored location's cache line is performed using a cache coherence system for the cache, such that cache coherence state machine transitions can trigger a loss of monitoring for the cache line.

3. The method of claim 1, wherein at least one of setting a read or write monitor on a first set of one or more memory locations or setting a read or write monitor on a second set of one or more memory locations comprises setting a read or write monitor on a memory mapped I/O location.

4. The method of claim 3, wherein the memory mapped I/O locations correspond to locations to accumulate events related to at least one of counters or timers.

5. The method of claim 3, wherein the memory mapped I/O locations correspond to location to accumulate events related to alarms or machine checks.

6. The method of claim 1, wherein at least one of setting a read or write monitor on a first set of one or more memory locations or setting a read or write monitor on a second set of one or more memory locations comprises setting a read or write monitor for intrusion detection.

7. The method of claim 1, wherein at least one of setting a read or write monitor on a first set of one or more memory locations or setting a read or write monitor on a second set of one or more memory locations comprises setting a read monitor on a data structure in a transaction and awaiting a loss of read monitoring event, so as to delay retry of the transaction until after another agent changes data in the monitored data structure so as to reduce the likelihood of subsequent transaction aborts and retries.

8. The method of claim 1, wherein at least one of setting a read or write monitor on a first set of one or more memory locations or setting a read or write monitor on a second set of one or more memory locations comprises setting a read or write monitor for monitoring a plurality of queues.

9. The method of claim 1, further comprising as a result of detecting a conflicting access to a monitored location, jumping to a software event handler.

10. The method of claim 1, wherein the processor level instruction included as part of an instruction set architecture for a processor which causes the thread a to suspend execution of instructions pending loss of a read or write monitor for the first or second set of one or more memory locations is not privileged such that it may be issued in user mode.

11. The method of claim 1, further comprising the thread executing a processor level instruction included as part of an instruction set architecture for a processor which causes all read and write monitors to be initialized to a deasserted state.

12. In a computing environment, a method of detecting memory accesses by other agents, the method comprising:
   a thread executing a processor level instruction included as part of an instruction set architecture for a processor, setting a write monitor to detect reads or writes on a first set of one or more memory locations in a cache local to a processor by another agent for the thread;

the thread executing a processor level instruction included as part of an instruction set architecture for a processor which causes the thread to suspend execution of instructions pending loss of write monitor for the first set of one or more memory locations in a cache local to a processor for the thread;

adding read and write monitoring indicator states to a cache state for each cache line in the cache;

the thread suspending execution of instructions whereby a processor for the thread enters a low power mode pending loss of a read or write monitor for the first or second set of one or more memory locations, including causing the processor to enter a low power mode without causing the cache control hardware to enter a low power mode;

detecting a conflicting access on the first set of one or more memory locations using a cache coherence system for the cache or detecting a timeout; and as a result of detecting a conflicting access or detecting the timeout, the thread resuming execution of instructions.

13. In a computing environment, a method of detecting memory accesses, the method comprising:

a thread executing a processor level instruction included as part of an instruction set architecture for a processor, setting a read monitor to detect writes by another agent on a first set of one or more memory locations in a cache local to a processor for the thread;

the thread executing a processor level instruction included as part of an instruction set architecture for a processor, setting a read monitor to detect writes by another agent on a second set of one or more different memory locations for the thread;

adding read and write monitoring indicator states to a cache state for each cache line in the cache;

the thread executing a processor level instruction included as part of an instruction set architecture for a processor which causes the thread to suspend execution of instructions pending loss of a read monitor for the first or second set of one or more memory locations;

the thread suspending execution of instructions whereby a processor for the thread enters a low power mode pending loss of a read or write monitor for the first or second set of one or more memory locations, including causing the processor to enter a low power mode without causing the cache control hardware to enter a low power mode;

detecting a conflicting access by another agent on the first or second set of one or more memory locations using a cache coherence system for the cache or detecting a timeout; and as a result of detecting a conflicting access or detecting the timeout, the thread resuming execution of instructions.

* * * * *

UNITED STATES PATENT AND TRADEMARK OFFICE
CERTIFICATE OF CORRECTION

| | | |
|---|---|---|
| PATENT NO. | : 8,161,247 B2 | Page 1 of 1 |
| APPLICATION NO. | : 12/493163 | |
| DATED | : April 17, 2012 | |
| INVENTOR(S) | : Gray et al. | |

It is certified that error appears in the above-identified patent and that said Letters Patent is hereby corrected as shown below:

In the Specification

Column 3, line 55, delete "and or" and insert -- and/or --, therefor.

In the Claims

Column 14, line 53, Claim 10, after "thread" delete "a".

Signed and Sealed this
Third Day of February, 2015

Michelle K. Lee
*Deputy Director of the United States Patent and Trademark Office*